(No Model.)
C. P. HAWLEY.
FERRULE AND LIKE ARTICLES.
No. 375,487. Patented Dec. 27, 1887.
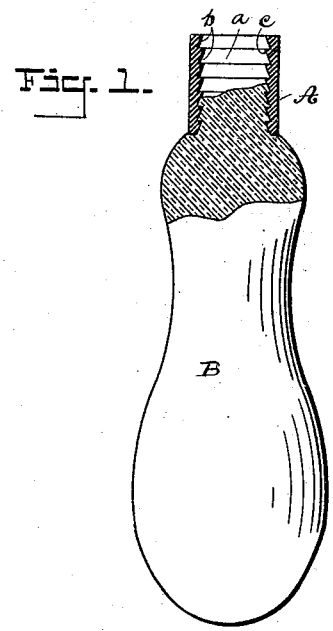
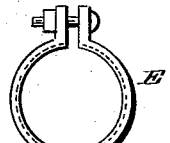
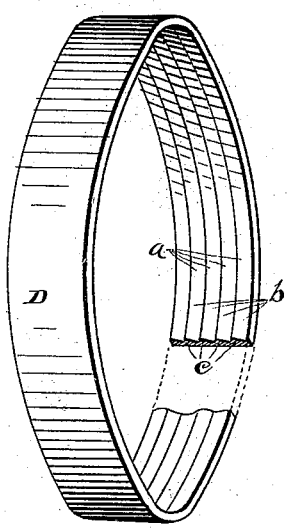
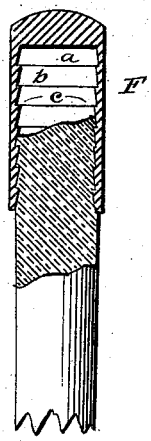
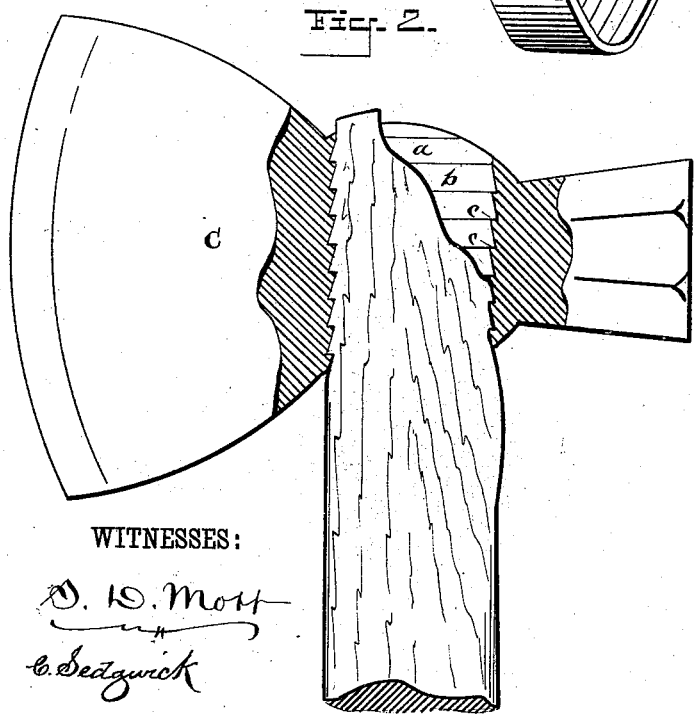
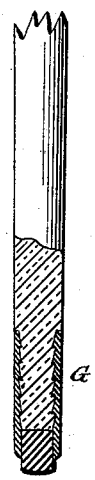
WITNESSES:
INVENTOR:
C. P. Hawley
BY Munn & Co.
ATTORNEYS.

UNITED STATES PATENT OFFICE.

CHARLES P. HAWLEY, OF NEW YORK, N. Y.

FERRULE OR LIKE ARTICLE.

SPECIFICATION forming part of Letters Patent No. 375,487, dated December 27, 1887.

Application filed May 4, 1887. Serial No. 237,070. (No model.)

*To all whom it may concern:*

Be it known that I, CHARLES P. HAWLEY, of the city, county, and State of New York, have invented new and useful Improvements in Ferrules and Like Articles, of which the following is a full, clear, and exact description.

The object of the invention is to improve the construction of ferrules and like articles—such as barrel-hoops, caps for canes, clamp-rings for spars and the like, and the eyes of axes, hammers, &c.; and the invention consists in so ridging or serrating the inner surface or bore of such ferrule, cap, band, or eye that a firm fastening of either or any of them to the article to which they are applied will be assured, as hereinafter described and claimed.

Reference is to be had to the accompanying drawings, forming a part of this specification, in which similar letters of reference indicate corresponding parts in all the figures.

Figure 1 is an elevation, partly in section, of a tool-handle the ferrule of which is formed in accordance with my invention. Fig. 2 is a like view of an ax, the eye of which is formed in accordance with my invention. Fig. 3 represents a barrel-hoop embodying my invention. Fig. 4 illustrates a clamp-ring for spars and the like, the serrations being indicated by dotted lines. Fig. 5 represents the invention as applied to the cap and ferrule of a cane.

As the invention is the same as embodied in all the articles to which I have shown it as applied, a detailed description of one instance of its application will suffice.

Referring specially to Fig. 1 of the drawings, the inner surface of the ferrule A of a tool-handle, B, is formed with a series of parallel notches, $a$, each notch being cut into the ferrule in a manner to form the inclined faces $b$ and a series of shoulders, $c$, which shoulders preferably range at right angles to the bore of the ferrule. With this construction, as the ferrule or other eye or band is forced onto the handle or other object, the inclined sides or faces $b$ of the several notches successively force inward the fibers of the wood, which fibers have a tendency to wedge themselves into said notches as the ferrule band or eye is being driven home. When the ferrule is fully driven home, the fibers, having expanded into the notches $a$, firmly hold the ferrule in place, as the shoulders $c$ thereon prevent return movement of the said ferrule by resistance against the fibers of the wood which fill the notches $a$, and only by a force sufficient to lacerate the fibers can the ferrule be removed.

Even should the wood of the handle, barrel, or other object shrink after the ferrule-band or eye has been applied the said ferrule band or eye will not become displaced, as no ordinary shrinkage will effect the full withdrawal of the fibers from the notches.

In previous attempts in this direction the article—such as the eye of an ax or hammer—has been formed with pins or spurs projecting at approximately right angles to the said eye; but in such cases a wedge was required to force the handle against the spurs to be penetrated thereby.

Ferrules also have been formed with internal screw-threads; but the slightest shrinkage allows the ferrule to unscrew from the handle or other object to which it may be applied.

With my invention the forcing on of the ferrule or like eye or band forces the fibers of the handle or other object inward, and the expansion of the fibers into the notches holds it in place even after shrinkage and without the aid of separate wedges.

My invention will be found very advantageous as applied to the hoops of barrels for containing spirituous liquors, where nails cannot be employed to secure the hoops.

The invention is also applicable to ferrules, bands, or eyes of polygonal cross-section, which is not the case with spiral serrations.

The ax C, hoop D, clamp-band E, and cane cap and ferrule F G are provided with notches corresponding to those in the ferrule A of tool-handle B.

Having thus described my invention, what I claim as new, and desire to secure by Letters Patent, is—

A ferrule or like article constructed with parallel internal notches, $a$, the said notches being formed to produce the inclined faces $b$ and parallel resistance-shoulders $c$ at right angles to the axis of the ferrule, substantially as and for the purpose specified.

CHARLES P. HAWLEY.

Witnesses:
LANSING VAN DEUSEN,
SANFORD VAN DEUSEN.